United States Patent Office 3,594,449
Patented July 20, 1971

3,594,449
POLYURETHANE CROSS-LINKED CHLORINATED POLYETHYLENES
Charles R. Binder, Romeo, Mich., assignor to General Motors Corporation, Detroit, Mich.
No Drawing. Filed Sept. 15, 1969, Ser. No. 858,145
Int. Cl. C08g 41/04
U.S. Cl. 260—859         3 Claims

ABSTRACT OF THE DISCLOSURE

A mixture containing 50 to 80 parts, by weight, chlorinated polyethylene, 20 to 50 parts, by weight, of an isocyanate terminated prepolymer and sufficient organic diamine to provide a slight excess of amine groups over isocyanate groups is readily moldable and will co-react at normal molding temperatures to form a polyurethane cross-linked chlorinated polyethylene having high strength and other desirable physical properties.

---

This invention is related to cross-linked chlorinated polyethylene compositions. More particularly, this invention is related to chlorinated polyethylenes which are cross-linked with diamine extended polyurethanes.

The properties of chlorinated polyethylene and of polyurethanes are generally widely known and these materials serve in many useful applications in commerce. It is felt, however, that the properties of chlorinated polyethylene could be favorably altered by reaction with suitable cross-linking agents. Up until the present time the principal cross-linking agents for chlorinated polyethylene have been peroxides. This cross-linking mechanism simply results in the polyethylene chains being directly attached together at various locations along the molecular backbone, there being no linking chain therebetween of a different chemical structure present for modification of properties.

It is an object of the present invention to provide a novel cross-linked chlorinated polyethylene composition wherein the chlorinated polyethylene chains are joined by reaction with an amine terminated polyurethane.

It is another object of the present invention to provide a moldable composition comprising chlorinated polyethylene and an isocyanate terminated prepolymer which is curable by reaction with a diamine to produce a polyurethane cross-linked chlorinated polyethylene.

In accordance with a preferred embodiment of my invention, these and other objects are accomplished by milling or otherwise mixing together by weight 50 to 80 parts chlorinated polyethylene, 20 to 50 parts of an isocyanate terminated prepolymer, and a sufficient quantity of an organic diamine based on the weight of said prepolymer to provide a ratio of about 1.1 to 1.2 amine groups to isocyanate groups. This mixture is milled at a temperature of about 100° C. during which time a uniform mixture is obtained and the diamine reacts with the prepolymer to form polyurethane molecular chains which are amine terminated. At this stage the mixture is molded and further heated to about 300° F. for thirty minutes for curing. The amine terminated polyurethane reacts with the pendant chlorine groups of the chlorinated polyethylene to form a cross-linked polymeric composition. In general, the cross-linked compositions of my invention have good strength, hardness, and tear properties, and are useful over a wide temperature range extending well below 0° C.

Other objects and advantages of my invention will be better appreciated in view of a more detailed description thereof which follows.

As is known, chlorinated polyethylenes are produced by chlorinating polyethylene, usually high density polyethylenes, to form a product containing up to about 50% chlorine by weight. Unlike poly(vinyl chloride) the chlorine atoms in chlorinated polyethylene are randomly distributed along the polyethylene molecular chains. This characteristic is particularly desirable in the practice of my invention because this random arrangement of pendant chlorine atoms renders the polymer more resistant to degradation under the conditions of cross-linking reactions. Depending upon the chlorine content and molecular weight, the chlorinated polyethylene may either be elastomeric or rigid at room temperature. In accordance with my invention it is suitable to use any chlorinated polyethylene which contains about 30% to 50% by weight chlorine.

Isocyanate terminated prepolymers (also called polyurethane prepolymers) are employed in large quantities in the synthesis of polyurethane compositions. The prepolymers are typically formed by first preparing organic polyhydroxy compounds such as polyether polyols or polyester polyols. Examples of suitable polyether polyols are polyoxypropylene polyols, polytetramethylene oxide diols, as well as polyols derived from such starter molecules as glycerine, dimethylolpropane, sorbitol, methyl glucoside, and sucrose. Suitable polyester polyols are formed by reacting difunctional alcohols such as diethylene glycol with difunctional acids such as adipic acid or acid anhydrides to form a polyester chain, there being an excess of polyol so that the chain is hydroxy terminated. Suitable polyester polyols have also been formed by the polymerization of caprolactone, the caprolactone being treated with a ring opening material which initiates the polymerization of the monomeric lactone. Once the hydroxy terminated polymers are prepared, preferably having a molecular weight of about 500 to 4500, they are reacted with a polyfunctional isocyanate to form an isocyanate terminated prepolymer. This is accomplished by reacting a slight molecular excess of an isocyanate such as hexamethylene diisocyanate, 2,4 toluene diisocyanate or the like to the hydroxy terminated polyether or polyester. The difunctional isocyanate molecules react at one end with the hydroxyl groups of the polyol to form urethane linkages and thereby endcap or terminate the prepolymers chain. The other end of the difunctional isocyanate molecule is available for further reaction with suitable chain extending agents. Preferably, the prepolymers contain about 2.0 to 9.5% by weight free isocyanate groups (—NCO).

For purposes of my invention the only suitable chain extending agents are organic diamines. In general, any organic diamine may be employed whether solid or liquid at room temperature or whether aliphatic or aromatic in character. Examples of some diamines are disclosed in connection with specific examples of my invention which are described below. Other suitable diamines include ethylene diamine, naphthalene diamine, 1,4-butylene diamine, and piperazine. Organic diamines contain reactive hydrogen groups which are capable of reacting both with the isocyanate groups of the prepolymers and the pendant chlorine groups of the chlorinated polyethylene. However, reaction of the diamine with isocyanate terminated prepolymers is much more rapid and is usually substantially complete before any significant amount of reaction with chlorinated polyethylene occurs.

Thus, in accordance with my invention, it is preferred to mix together chlorinated polyethylene, an isocyanate terminated prepolymer, and an organic diamine preferably by roller milling at a temperature no greater than about 100° C. At this temperature there is little tendency for the materials to thermally degrade, or for the chlorinated polyethylene to self cross-link. A slight chemical excess of the diamine with respect to prepolymer is employed so that the ratio of amine groups to isocyanate groups in the mixture is in the range of 1.1 to 1.2. During the milling operation at about 100° C., the diamine undergoes chemical reaction with the isocyanate endcapped prepolymer to chain extend the prepolymer thereby forming a polyurethane chain which is amine terminated. This milling operation is usually accomplished in about five to fifteen minutes and little, if any, cross-linking of the chlorinated polyethylene occurs. The mixture is readily moldable. Upon molding, it is heated at about 300° F. for about thirty minutes to effect a cure. During the curing period many of the amine terminated polyurethane chains of random lengths react with the pendant chlorine of the chlorinated polyethylene. Since the amine terminated polyurethane chains are at least difunctional with respect to the amine groups, two or more chlorine polyethylene chains are tied or cross-linked together. Hydrogen chloride is involved as a byproduct.

To obtain the desirable properties of my cured compositions, I prefer to mix approximately equal quantities by weight of the chlorinated polyethylene and isocyanate end-capped prepolymer. However, compositions comprising by weight 50–80 parts chlorinated polyethylene and 20–50 parts isocyanate terminated prepolymers may be cross-linked to obtain desirable properties in accordance with my invention. As indicated above, the quantity of diamine employed is based on the number of equivalents of isocyanate groups present in the prepolymer. It will be appreciated that since the portions of polyurethane prepolymers and chlorinated polyethylene are specified in terms of weight rather than chemical equivalency, the resulting product will not necessarily consist solely of cross-linked chlorinated polyethylene. It is entirely possible to have an excess of either chain extended polyurethane or of chlorinated polyethylene at the completion of the curing reaction. However, by employing chlorinated polyethylene of chlorine content specified and isocyanate terminated prepolymers of the molecular weight range specified, in accordance with the above formulation, useful compositions are obtained having desirable properties.

Some specific examples will further illustrate the practice of my invention.

Fifty parts of chlorinated polyethylene were banded on a hot mill at 100° C. The chlorinated polyethylene was commercial material and contained 48% by weight chlorine. To this was added 50 parts of an isocyanate endcapped polyether polyol to form a pastelike material. The prepolymer was formed by the reaction of 2,4-toluene diisocyanate with polytetramethylene oxide having a molecular weight of about 2500. This isocyanate endcapped polyol had a free isocyanate content of about 4% by weight. Stearic acid (1.6 parts) and litharge (8 parts) were then added to the mill. The litharge or like basic material is necessary to provide a basic environment for the final curing step. The stearic acid is employed to assist in solubilizing the litharge in the polymer mixture. To this mixture was added 6.9 parts of 4,4'-methylene bis-(2-chloroaniline). All these materials were milled together at 100° C. for about five minutes. Polymerization of the prepolymers commenced immediately as evidenced by the transformation of the original pastelike material on the mill to a tougher, more rubbery-like material.

The mixture was removed from the mill and cut and molded into the shape of tensile slabs having dimensions of 6" x 6" x ⅛". The slabs were cured for thirty minutes at 300° F. During this period, polymerization of the prepolymers was substantially completed and cross-linking of the chlorinated polyethylene took place. The polymeric slabs removed from the mold press were shiny and rubberlike. Test specimens were cut from these slabs for determining the tensile strength, percent elongation, modulus of elasticity at 300% elongation, tear strength, Shore A hardness and stiffening point of my cured chlorinated polyethylene material. The measured values of these properties are summarized in the second table below in connection with formulation No. 1.

A number of other formulations were also prepared and tested with respect to the same physical properties. Throughout this series of formulations and tests the same chlorinated polyethylene, containing 48% chlorine, and toluene diisocyanate endcapped polytetramethylene oxide polyol were employed. These materials are commercially available and particularly suitable for use in my invention. It is also desired to demonstrate the use of a large number of different diamines in the practice of my invention. The different formulations are summarized in the first table below and the physical properties of molded specimens are summarized in the second table. In each instance the method of mixing and curing was identical with that set forth with respect to Example I. It is to be noted that both aromatic and aliphaic diamines were employed, as well as diamines which were either liquid or solid at the melting temperature. When a diamine is employed which is solid at 100° C., it is preferable to dissolve the amine in a solvent which boils below 100° C. so that the amine may be thoroughly mixed with the other materials. This was done in formulation No. 7 wherein p-phenylene diamine was used. This solid amine (7.5) parts was dissolved in 150 cc. of methyl ethyl ketone and added to the polymeric materials on the hot mill. Methyl ethyl ketone rapidly evaporated. To assure that sufficient diamine would be incorporated in all parts of the mixture, an excess of the diamine was employed in this instance beyond the preferred range of 1.1 to 1.2 amine groups per isocyanate groups which are specified above. However, it is noted that the modulus and tensile strength of the molded product were adversely affected and that generally only 10 to 20% excess diamine should be employed.

Following are the tables summarizing the formulations tested and the properties obtained.

TABLE I

| | Formulation number | | | | | | |
|---|---|---|---|---|---|---|---|
| | 1 | 2 | 3 | 4 | 5 | 6 | 7 |
| Chlorinated polyethylene (48% chlorine) | 80 | 50 | 50 | 50 | 50 | 50 | 50 |
| Isocyanate endcapped polyol | 20 | 50 | 50 | 50 | 50 | 50 | 50 |
| Stearic acid | 1.6 | 1 | 1 | 1 | 1 | 1 | 1 |
| Litharge | 8.0 | 5 | 5 | 5 | 5 | 5 | 5 |
| 4,4'-methylene bis-(2 chloroaniline) | 6.9 | 6.9 | | | | | |
| 1,8-diamino-p-menthane | | | | | 4.5 | | |
| m-Phenylene diamine | | | | | | 2.5 | |
| Hexamethylene diamine | | | | | | | 3 |
| p-Phenylene diamine | | | | | | | 7.5 |
| Methylene dianiline | | | | 5.2 | | | |

TABLE II

| Formulation Number | Modulus (p.s.i.) [1] | Tensile (p.s.i.) | Percent elongation | Tear, lbs./ inches | Shore A hardness | Stiffening point, ° C. |
|---|---|---|---|---|---|---|
| 1 | 960 | 1,725 | 375 | 150 | 75 | −29 |
| 2 | 780 | 995 | 450 | 200 | 75 | −53 |
| 3 | 1,190 | 1,260 | 330 | 300 | 80 | −56 |
| 4 | 960 | 1,876 | 415 | 237 | 73 | |
| 5 | 770 | 1,155 | 420 | 203 | 77 | −58 |
| 6 | 540 | 892 | 385 | 129 | 66 | −60 |
| 7 | 460 [2] | 466 | 110 | 189 | 76 | −66 |

[1] At 300% elongation.
[2] At 100% elongation.

The above examples were carried out with particular chlorinated polyethylene and isocyanate endcapped polyol. It is to be understood that any chlorinated polyethylene containing 30% to 50% by weight chlorine may be employed and that, in general, any isocyanate endcapped polyol may be employed as has earlier been described.

Therefore, while my invention has been described in terms of a few specific embodiments thereof, it will be appreciated that other forms can readily be adapted by one skilled in the art and that the scope of my invention is not to be considered limited to the embodiments specifically disclosed.

I claim:
1. A thermoset composition consisting essentially of the reaction product of
   (a) 50 to 80 parts by weight chlorinated polyethylene containing up to 50% by weight chlorine,
   (b) 20 to 50 parts by weight of an isocyanate terminated prepolymer having a molecular weight of about 500 to 4500 and an —NCO content of about 2.0% to 9.5% by weight, and
   (c) a sufficient amount of an organic diamine to provide 1.1 to 1.2 chemical equivalents thereof per equivalent of said prepolymer.
2. A cured chlorinated polyethylene composition consisting essentially of the reaction product of
   (a) 50 to 80 parts by weight of a chlorinated polyethylene containing 30% to 50% by weight chlorine,
   (b) 20 to 50 parts by weight of an isocyanate terminated polyether polyol prepolymer having a molecular weight of about 500 to 4500 and an —NCO content of about 2.0% to 9.5% by weight, and
   (c) a sufficient amount of an organic diamine to provide 1.1 to 1.2 chemical equivalents thereof per equivalent of said prepolymer.
3. A cured chlorinated polyethylene composition consisting essentially of the reaction product of
   (a) 50 to 80 parts by weight of a chlorinated polyethylene containing 30% to 50% by weight chlorine, and
   (b) an amine terminated polyurethane, where (b) is itself the reaction product of 20 to 50 parts by weight of an isocyanate terminated prepolymer having a molecular weight of about 500 to 4500 and an —NCO content of about 2.0% to 9.5% by weight with a sufficient amount of an organic diamine to provide 1.1 to 1.2 chemical equivalents thereof per equivalent of said prepolymer.

References Cited

UNITED STATES PATENTS

| | | | |
|---|---|---|---|
| 3,100,759 | 8/1963 | Boussu | 260—858 |
| 3,429,948 | 2/1969 | Massoubre | 260—859 |

FOREIGN PATENTS

| | | | |
|---|---|---|---|
| 945,797 | 1/1964 | Great Britain. | |
| 1,014,597 | 12/1965 | Great Britain | 260—859 |
| 1,088,365 | 10/1965 | Great Britain | 260—859 |
| 1,119,041 | 7/1968 | Great Britain | 260—859 |

PAUL LIEBERMAN, Primary Examiner

U.S. Cl. X.R.

260—13, 75NH, 77.5AM, 77.5AN, 77.5AS